(12) United States Patent
Burtner et al.

(10) Patent No.: US 10,979,487 B2
(45) Date of Patent: Apr. 13, 2021

(54) DESKTOP ASSISTANT FOR MULTIPLE INFORMATION TYPES IN A TIMELINE VIEW

(71) Applicant: Microsoft Technology Licensing, LLC, Redmond, WA (US)

(72) Inventors: Edwin R. Burtner, Everett, WA (US); Thomas V. Gruver, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 15/962,452

(22) Filed: Apr. 25, 2018

(65) Prior Publication Data
US 2018/0278673 A1 Sep. 27, 2018

Related U.S. Application Data

(63) Continuation of application No. 14/145,787, filed on Dec. 31, 2013, now Pat. No. 9,986,015, which is a (Continued)

(51) Int. Cl.
*G06Q 10/10* (2012.01)
*H04L 29/08* (2006.01)
(Continued)

(52) U.S. Cl.
CPC ............ *H04L 67/06* (2013.01); *G06Q 10/10* (2013.01); *G06Q 10/107* (2013.01);
(Continued)

(58) Field of Classification Search
CPC .... G06Q 10/10; G06Q 10/107; G06Q 10/109; H04L 51/16; H04L 51/24; H04L 67/06; H04L 5/0078; Y10S 715/963; H04M 1/72552; H04M 1/72555; H04M 1/72563; H04M 1/72566
See application file for complete search history.

(56) References Cited

U.S. PATENT DOCUMENTS 6,092,067 A * 7/2000 Girling ................. G06Q 10/10
6,522,347 B1 * 2/2003 Tsuji ..................... G06Q 30/02
345/419
(Continued)

FOREIGN PATENT DOCUMENTS

WO   WO-9629660 A1 *  9/1996  ......... G06F 16/9574

*Primary Examiner* — Daniel Samwel
(74) *Attorney, Agent, or Firm* — Michael Best & Friedrich LLP

(57) ABSTRACT

A method and system for providing an aggregate view of information that a user may need is provided. A desktop assistant system collects information items that a user may need such as scheduling information and recently received messages. The desktop assistant system may also identify documents that the user may need and contacts with whom the user may need to communicate based on analysis of the collected scheduling information and the collected messages. The desktop assistant system then displays indications of the collected scheduling information, the collected messages, the identified documents, and the identified contacts so that the user has an integrated view of the needed information items.

15 Claims, 10 Drawing Sheets

Related U.S. Application Data continuation of application No. 11/468,967, filed on Aug. 31, 2006, now Pat. No. 8,621,373.

(51) Int. Cl.
  *H04L 5/00* (2006.01)
  *H04L 12/58* (2006.01)

(52) U.S. Cl.
  CPC ......... *G06Q 10/109* (2013.01); *H04L 5/0078* (2013.01); *H04L 51/16* (2013.01); *Y10S 715/963* (2013.01)

(56) References Cited

U.S. PATENT DOCUMENTS

| | | | | |
|---|---|---|---|---|
| 6,809,724 B1* | 10/2004 | Shiraishi | ................ | G06F 1/163 345/157 |
| 7,072,450 B1* | 7/2006 | Pinard | .................... | G06Q 10/10 345/419 |
| 2002/0085034 A1* | 7/2002 | Cortright | ............ | G06F 3/04847 715/764 |
| 2004/0153456 A1* | 8/2004 | Charnock | ............ | G06F 16/358 |
| 2004/0267700 A1* | 12/2004 | Dumais | ............... | G06F 16/9535 |
| 2005/0057584 A1* | 3/2005 | Gruen | .................. | G06Q 10/107 715/752 |
| 2005/0268237 A1* | 12/2005 | Crane | .................. | G06F 3/0481 715/732 |
| 2005/0286428 A1* | 12/2005 | Oksanen | ................ | G06Q 10/10 370/241 |
| 2007/0060205 A1* | 3/2007 | Kim | ..................... | G06Q 10/025 455/566 |
| 2007/0120856 A1* | 5/2007 | De Ruyter | ............ | G06F 3/0481 345/440 |
| 2007/0257916 A1* | 11/2007 | Krishnamoorthi | ..... | G06Q 10/10 345/440 |

* cited by examiner

DESKTOP ASSISTANT FOR MULTIPLE INFORMATION TYPES IN A TIMELINE VIEW

CROSS REFERENCE TO RELATED APPLICATION

This application is a continuation application of U.S. patent application Ser. No. 14/145,787, entitled "DESKTOP ASSISTANT FOR MULTIPLE INFORMATION TYPES," which is a continuation application of U.S. patent application Ser. No. 11/468,967, issued as U.S. Pat. No. 8,621,373, entitled "METHOD AND SYSTEM FOR PROVISIONING A WIRELESS DEVICE," which are both incorporated herein in their entirety by reference.

BACKGROUND

Users of computer systems may access information items of various types to assist them in performing their daily tasks. The types of information items may include messages, calendar information, documents, contact information, and other information sources. The messages may include electronic mail messages, Voice over Internet Protocol ("VoIP") messages, instant messages, and voice mail messages. The calendar information may include scheduled meetings and to-do lists. The documents may include reports, memoranda, design documents, letters, and so on. The contact information may include electronic mail addresses, telephone numbers, and presence information. The other information sources may include web databases, RSS feeds, news services, and so on. Typically, different information client applications are used to support different types of information. For example, a user who wants to send a message using instant messaging and electronic mail would need to have installed on their computer system an electronic mail client application and an instant messaging client application. As another example, a user who wants to access a SQL database would need a SQL client application, and a user who wants to access a web database would need a web client application. Each client application, however, provides its own interface or context for its information items. An electronic mail client application may provide a context that includes from, to, subject, and input fields and icons for creating messages, sending messages, replying to messages, resolving addresses, and so on. An instant messaging client application may provide a context that includes a list of contacts that are online, a pop-up window that is displayed when a message arrives, and a chat window for displaying and inputting instant messages.

When a user wants to plan out their day, the user may need to access information items of many different types. For example, a user may want to review calendar information about a scheduled meeting, review documents related to the scheduled meeting, have discussions with other invitees before the meeting, review electronic mail messages relating to the meeting, and so on. It can be a very difficult task for a user to gather all the needed information because the user may need to access many different information client applications.

In addition, a user who is performing a task may be bombarded with messages sent from others that are unrelated to the task being performed. For example, a user who is preparing a financial statement for a corporation may receive an instant message from a personal friend or may receive an electronic mail message reporting a recent news event. The user may get distracted by such unrelated messages, resulting in loss of concentration and lower efficiency. Although the user could effectively go offline to avoid being interrupted by any messages, the user would not be able to receive very important messages that are related to the task being performed.

SUMMARY

A method and system for providing an aggregate view of information that a user may need is provided. A desktop assistant system collects information items that a user may need such as scheduling information and recently received messages. The desktop assistant system may also identify documents that the user may need and contacts with whom the user may need to communicate based on analysis of the collected scheduling information and the collected messages. The desktop assistant system then displays indications of the collected scheduling information, the collected messages, the identified documents, and the identified contacts so that the user has an integrated view of the needed information items. The desktop assistant system may collect and display detailed information related to a specific information item such as a meeting, an electronic mail message, or a document. When the user selects a currently displayed indication of an information item, the desktop assistant system gathers and displays the related information.

The desktop assistant system may also display communications for different communication types organized by time slots. The desktop assistant system may display a timeline with time slot markings. The desktop assistant system displays an indication of the communications aligned with the corresponding time slot. The desktop assistant system may also align indicators for the same types of communications. The aligning of communications based on time slots provides a user with an overview of the timing of communications of different types.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
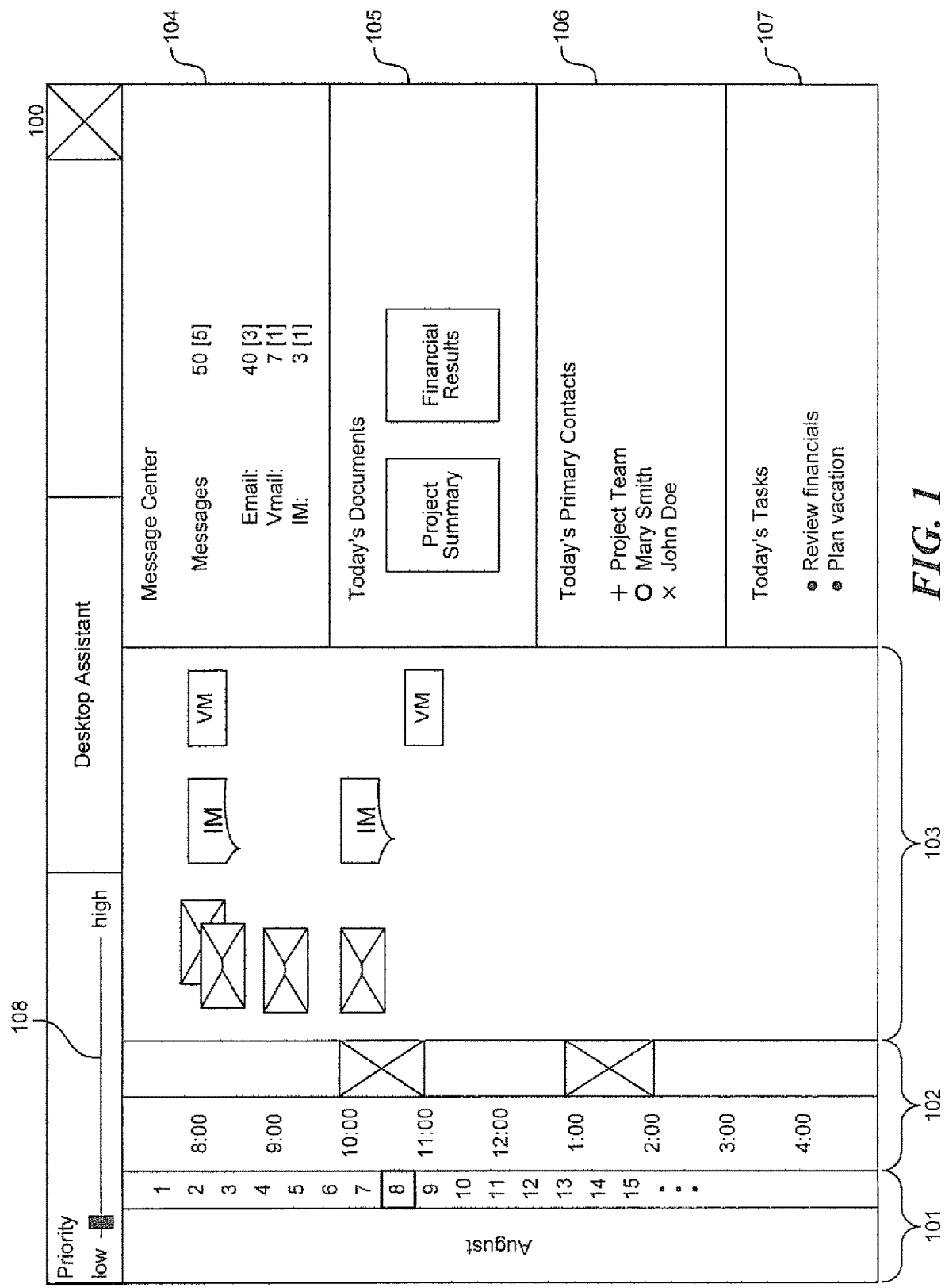
FIG. 1 illustrates an overview display page of the desktop assistant system in one embodiment.

A method and system for providing an aggregate view of information that a user may need is provided. In one embodiment, a desktop assistant system collects information items that a user may need such as scheduling information and recently received messages. The desktop assistant system may interface with one or more electronic mail systems (e.g., a HOTMAIL server or an EXCHANGE server) to retrieve electronic mail messages and may interface with one or more calendaring systems (e.g., a personal and business calendar systems) to retrieve the scheduling information. The desktop assistant system may also identify documents (e.g., text files, web sites, electronic mail messages, and their metadata) that the user may need and contacts with whom the user may need to communicate based on analysis of the collected scheduling information, the collected messages, and associated metadata. For example, the desktop assistant system may identify an agenda for a scheduled meeting by retrieving a document stored by a file system and may identify senders who have recently sent electronic mail messages by using their electronic mail addresses to retrieve their names from an address book. The desktop assistant system then displays indications of the collected scheduling information, the collected messages, the identified documents, and the identified contacts so that the user has an integrated view of the needed information items. In one embodiment, the desktop assistant system may collect and display detailed information related to a specific information item such as a meeting, an electronic mail message, or a document. For example, when a user selects a meeting, the desktop assistant system may display the meeting notice, names of the invitees of the meeting, documents relating to the meeting, and so on. When the user selects a currently displayed indication of an information item, the desktop assistant system gathers and displays the related information.

In one embodiment, the desktop assistant system displays messages for different types of communications organized by time slots. For example, a day may be divided into 24 one-hour time slots. The desktop assistant system may display a timeline, horizontally or vertically, with time slot markings. The desktop assistant system displays an indication of the communications aligned with the corresponding time slot. For example, if a user has received three electronic mail messages with arrival times of 1:05 p.m., 1:30 p.m., and 1:32 p.m., the desktop assistant system displays an indicator (e.g., icon) of the messages aligned with the 1:00 p.m. time slot. If the timeline is displayed vertically, then the indicators may be aligned horizontally with the time slots. The desktop assistant system may also align indicators for the same types of messages. For example, the desktop assistant system may align the indicators of electronic mail messages, may align the indicators of instant messages, and may align the indicators of voice mail messages. If the timeline is displayed vertically and the indicators are aligned horizontally with the time slots, then the indicators for the different types of messages may be aligned vertically. The aligning of messages based on time slots provides a user with an overview of the timing of messages of different types. The desktop assistant system may also align calendar information (e.g., scheduled meetings) with the timeline so that the user can see the timing of meetings relative to the timing of received messages. The desktop assistant may align communications other than messages such as RSS feeds.

In one embodiment, the desktop assistant system allows a user to establish a priority threshold for information items that are to be displayed. The desktop assistant may display a selector, such as a slider or a data entry field, that allows a user to select a continuous priority threshold (e.g., between 0 and 100 or between low and high). For example, when the desktop assistant system displays a slider, a user may move the slider to increase or decrease the priority threshold. The desktop assistant system filters information items based on the priority threshold so that information items that do not satisfy the priority threshold are not displayed. In addition, when new messages are received, the desktop assistant system applies the priority threshold to determine whether an indicator of the message should be displayed. The desktop assistant system may also allow a user to specify rules for determining whether an information item satisfies a priority threshold. The rules may be in the form of a condition and action pair. If the condition is satisfied, then the action is performed. For example, a condition may be satisfied when an instant message is sent from a certain recipient, and the action may be to filter out the instant message. In this way, the desktop assistant system allows users to control what information items are displayed by level of priority. When a user is performing a high priority task, the user may set the priority threshold to high to limit interruptions. Alternatively, the desktop assistant system may automatically adjust the priority threshold. For example, depending on available display space, the desktop assistant may increase and decrease the threshold. The desktop assistant may also analyze the presence information of the user and adjust the threshold accordingly. For example, if the user is currently editing a high priority document, the desktop assistant system may automatically set the priority threshold to be the same as that of the document to prevent interruptions with lower priorities.

FIG. 1 illustrates an overview display page of the desktop assistant system in one embodiment. Display page 100 includes a date area 101, a time slot area 102, a time slot message area 103, a message center area 104, a today's documents area 105, a today's primary contacts area 106, a today's tasks area 107, and a priority selector area 108. The date area 101 may contain an indication of the current month and a list of the dates within the month with the current date highlighted. A user can select different dates and months within the date area. The time slot area 102 includes time slots marked with the corresponding times. In this example, the time slot area includes time slots between 8 a.m. and 4 p.m. at one-hour intervals. The time slot area also includes a calendar area indicating the times of scheduled meetings. In this example, the calendar area indicates that meetings are scheduled for 10 a.m. and 1 p.m. The time slot message area 103 includes icons indicating messages that have been received aligned with corresponding time slots. In this example, an electronic message is represented by an envelope icon, an instant message is represented by an icon containing "IM," and a voice mail message is represented by an icon containing "VM." The icons of the messages are aligned with the corresponding time slots. For example, the icon to the right of the 9 a.m. time slot indicates that an electronic mail message was received sometime between 9 a.m. and 10 a.m. The icons to the right of the 10 a.m. time slot indicate that an electronic mail message and an instant message were received between 10 a.m. and 11 a.m. The icons for the different types of messages are also aligned. In this example, the icons for the different types of messages are aligned vertically. The time slot message area may also display a short description for each icon, such as part of the subject line of an electronic mail message. Icons for other types of information (e.g., RSS feeds) may also be aligned with the time slots. The message center area 104 provides a summary of the pending messages that have been received by the user. The today's documents area 105 contains an indication of documents that the user may need today. The desktop assistant system may identify the documents that are needed today by analyzing recently received messages and scheduling information for upcoming meetings. The documents may be arranged in priority order. The today's primary contacts area 106 provides an indication of the people with whom the user may need to communicate today. The today's tasks area 107 contains an indication of the tasks that the user wants to perform today. The priority selector area 108 contains a slider for adjusting the priority threshold.

Figure 2:
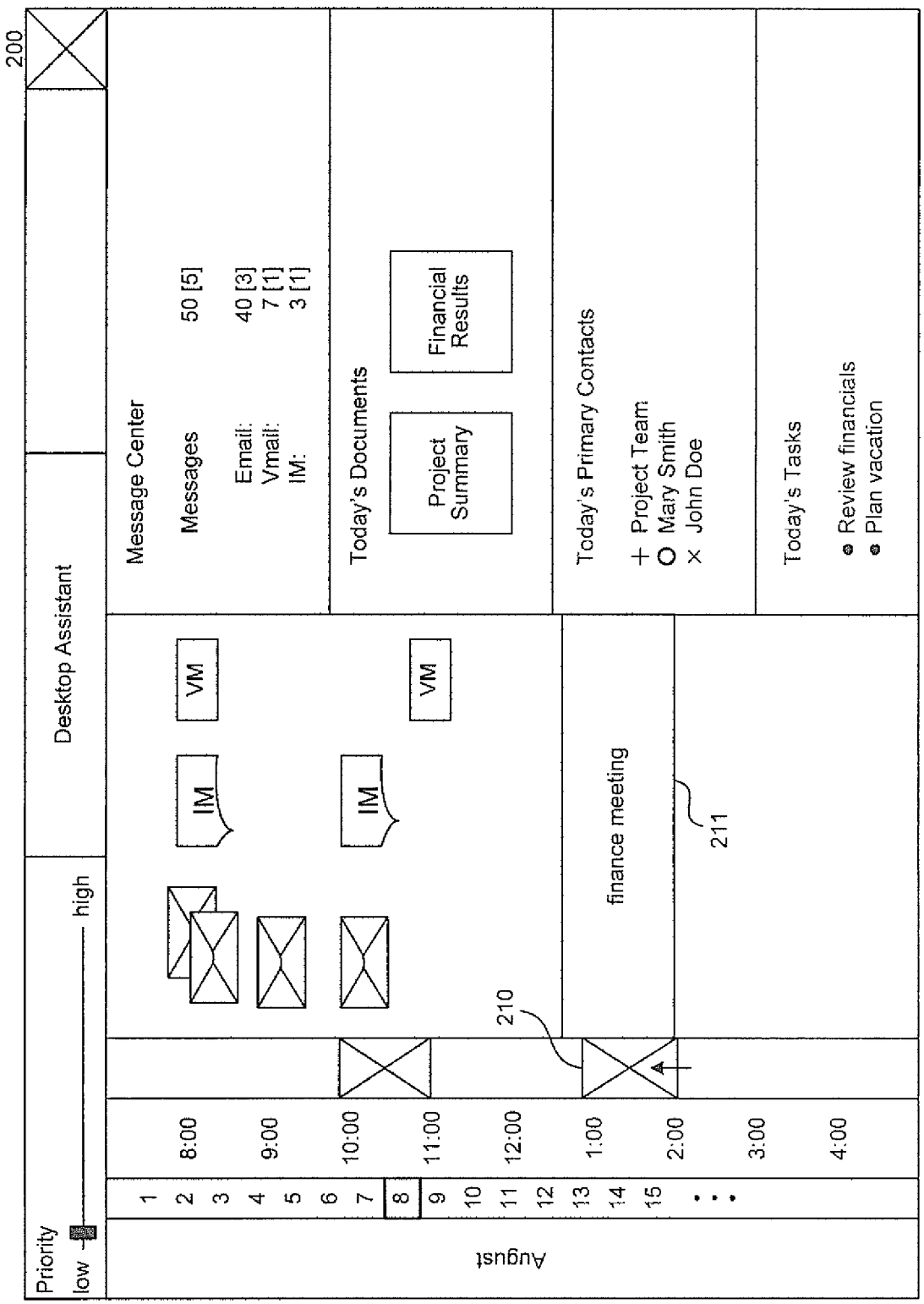
FIG. 2 illustrates a display page with more information about an information item in one embodiment.

FIG. 2 illustrates a display page with more information about an information item in one embodiment. Display page 200 includes an indication 210 of a meeting that starts at 1 p.m. and an associated description 211. The associated description was displayed by the desktop assistant system when a user hovered the mouse pointer over the indication of the meeting. A user can hover the mouse pointer over the indications of any of the information items to display more information. For example, when the mouse pointer hovers over a document, the desktop assistant system may display metadata of the document.

Figure 3:
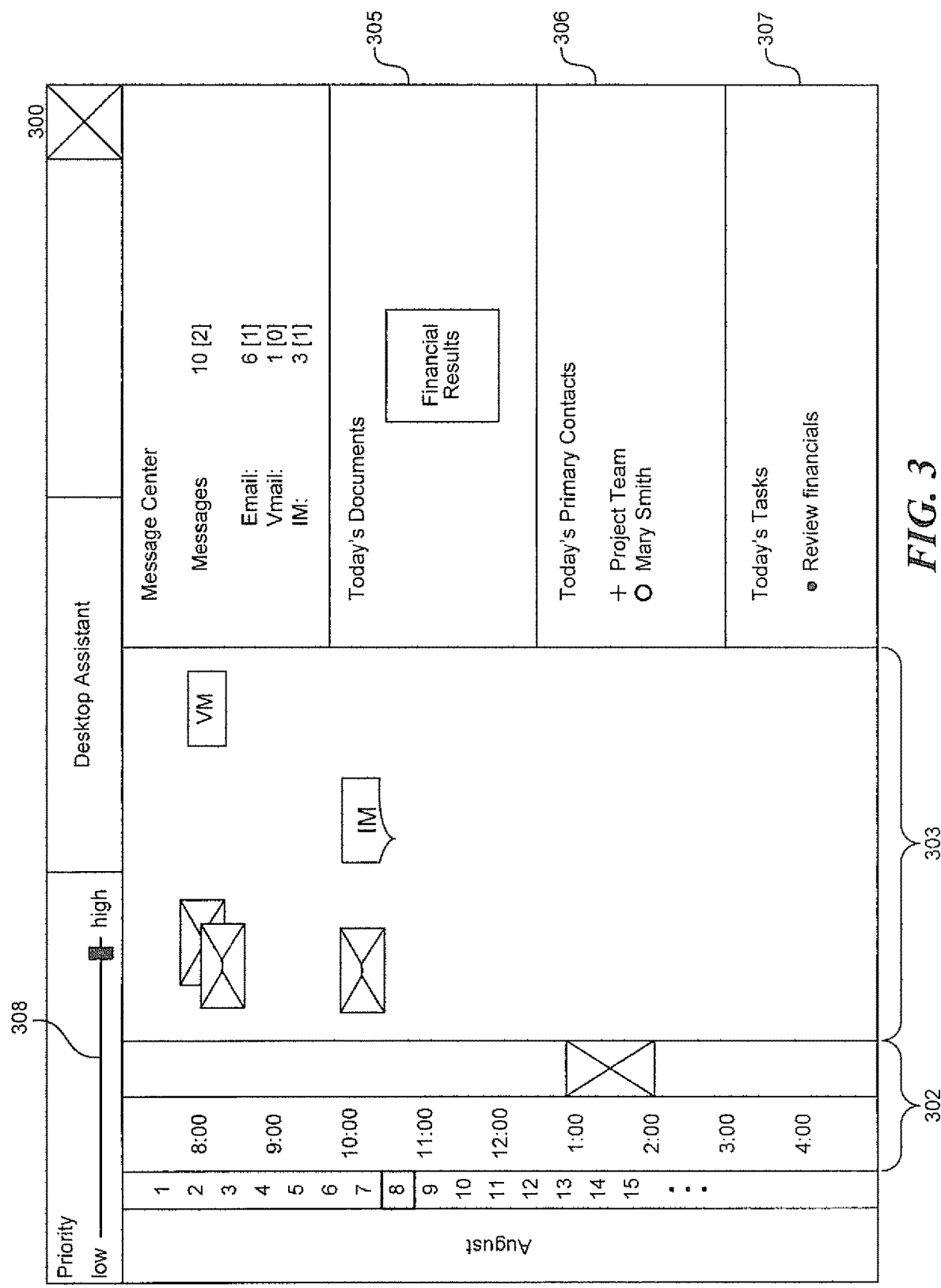
FIG. 3 illustrates a display page when information items are filtered according to the priority threshold in one embodiment.

FIG. 3 illustrates a display page when information items are filtered according to the priority threshold in one embodiment. Display page 300 corresponds to the display page 100 of FIG. 1, except that the priority threshold has been changed. In this example, a user has selected a high priority threshold as indicated by a slider 308. In response to the priority threshold being changed, the desktop assistant system filtered out information items that did not satisfy the priority threshold and removed them from the display. Because the meeting scheduled at 10 p.m. has a priority that was not high, the desktop assistant system removed the indication of that meeting from a time slot area 302. The desktop assistant system also removed icons for various messages with priorities that did not satisfy the priority threshold as indicated by a time slot message area 303. Similarly, the desktop assistant system made adjustments to a today's documents area 305, a today's primary contacts area 306, and a today's tasks area 307.

Figure 4:
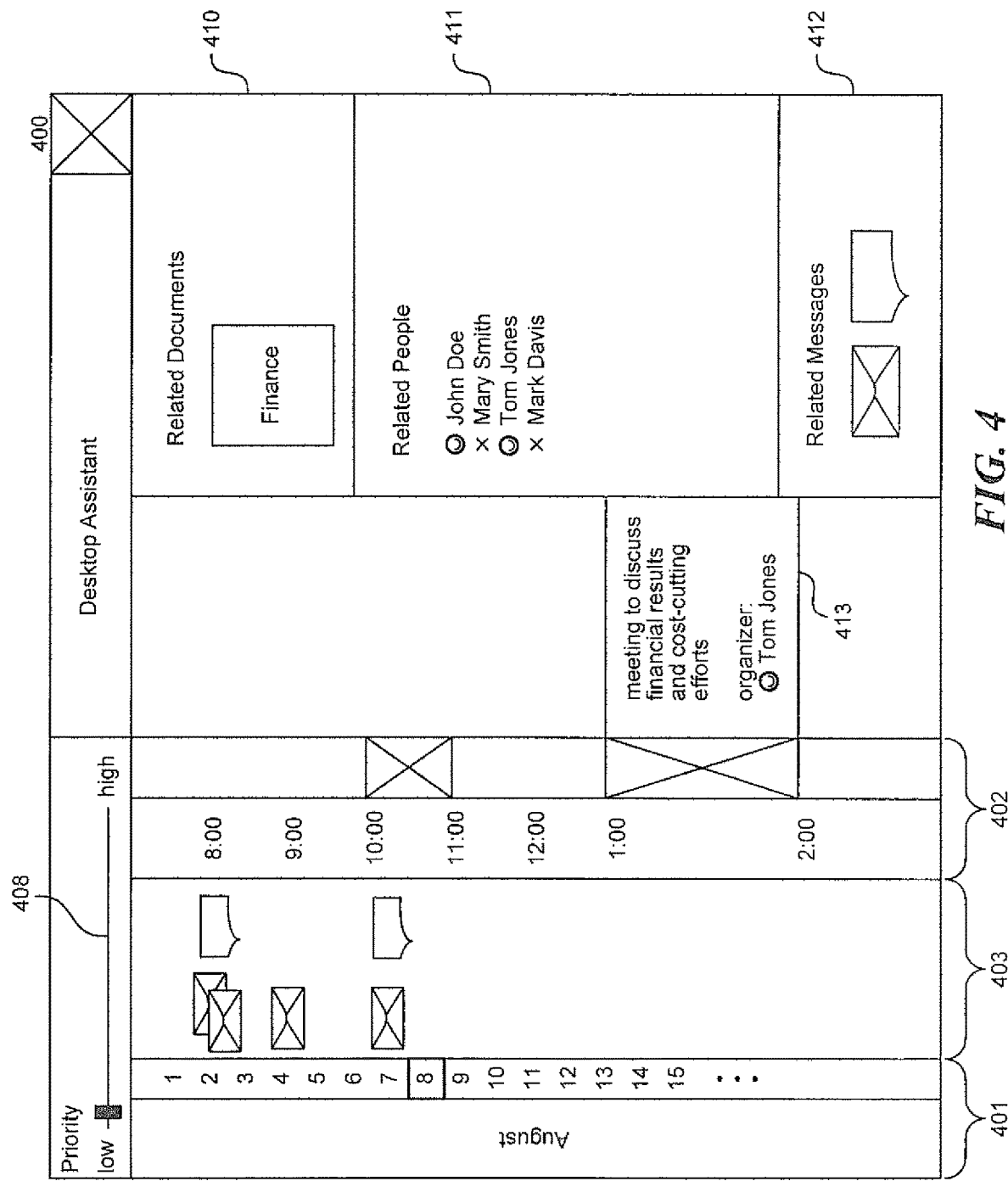
FIG. 4 illustrates a display page that displays detailed related information about a selected information item in one embodiment.

FIG. 4 illustrates a display page that displays detailed related information about a selected information item in one embodiment. Display page 400 includes a date area 401, a time slot area 402, a time slot message area 403, a related documents area 410, a related people area 411, a related messages area 412, and a priority selector 408. When a user selected the indicator for the 1 p.m. meeting, the desktop assistant system collected related information items and displayed the information items in the illustrated layout. The desktop assistant system also displayed a detailed description 413 of the meeting. In this example, all the information items to the right of the time slot area relate to the 1 p.m. meeting. If the user then selects an icon for a message, the desktop assistant system collects information items related to that message and displays indications of the information items.

Figure 5:
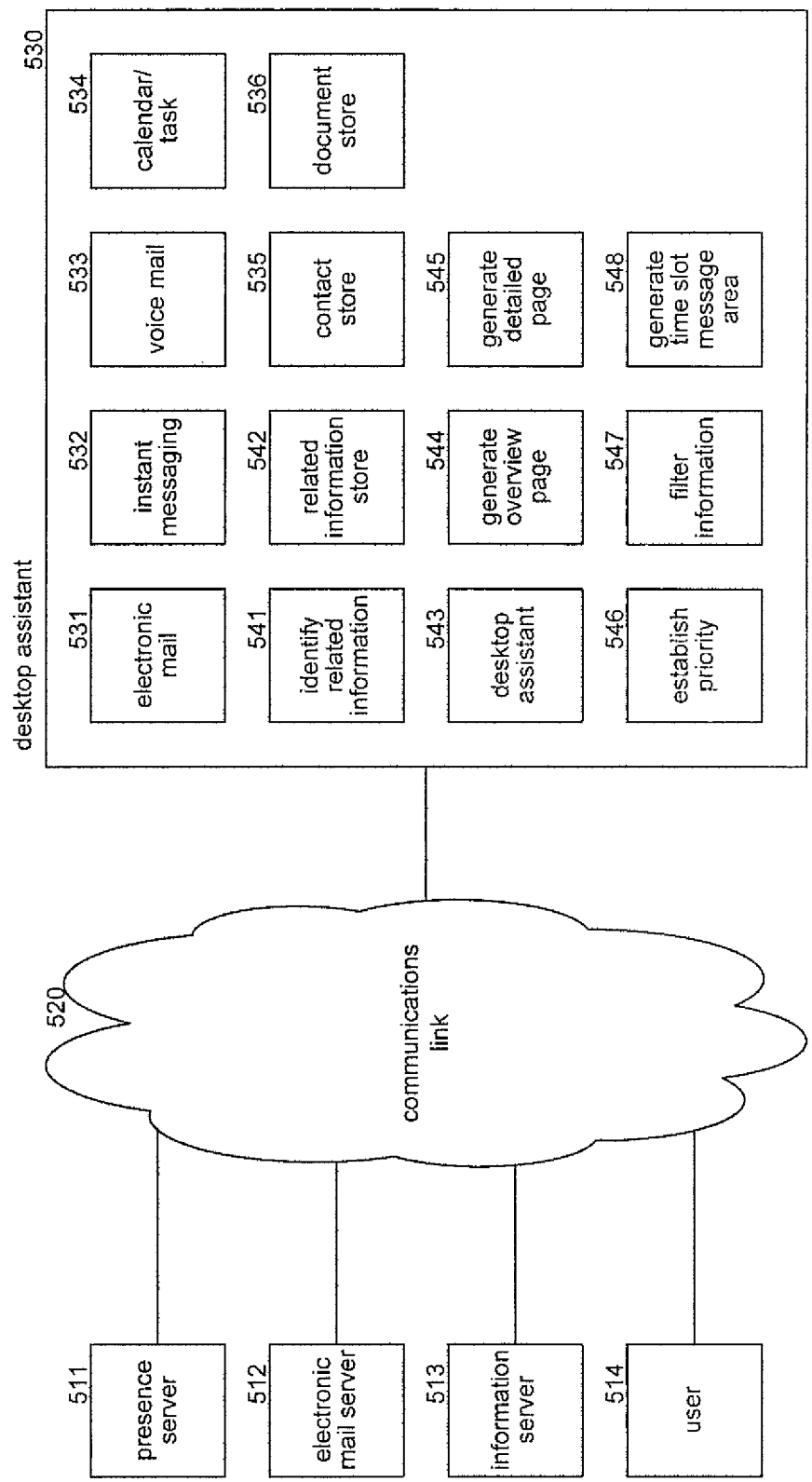
FIG. 5 is a block diagram that illustrates components of the desktop assistant system in one embodiment.

FIG. 5 is a block diagram that illustrates components of the desktop assistant system in one embodiment. The desktop assistant system 530 is connected to a presence server 511, an electronic mail server 512, an information server 513, and a user computer 514 via a communications link 520. The desktop assistant system may also be connected to many other user computer systems and information systems and may subscribe to the presence information of multiple contacts. The desktop assistant system may interface with an electronic mail client application 531, an instant messaging client application 532, a voice mail client application 533, and a calendar/task client application 534. Each of these client applications may interact with a corresponding server that stores the information items of the client application. The desktop assistant system may also include a contact store 535 and a document store 536. The contact store may contain contact information including the current presence information of various contacts that may be periodically provided by the presence server. The document store may contain documents of a file system. The desktop assistant system also includes an identify related information component 541 and a related information store 542. The identify related information component identifies information related to an information item and stores indications of the related information in the related information store. A system for identifying related information is described in U.S. patent application Ser. No. 10/827,920, entitled "Systems and Methods for Performing Background Queries from Content and Activity," which is hereby incorporated by reference. The desktop assistant system also includes a desktop assistant component 543, a generate overview page component 544, a generate detailed page component 545, an establish priority component 546, a filter information component 547, and a generate time slot message area component 548. The desktop assistant component invokes the generate overview page component and the generate detailed page component to display pages corresponding to the display pages of FIG. 1 and FIG. 4. The establish priority component is invoked when a user changes the priority threshold. The filter information component is invoked to filter information items based on the current priority threshold. The generate time slot message area component aligns messages based on the corresponding time slots and message types.

The computing devices on which the desktop assistant system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the desktop assistant system. In addition, the instructions, data structures, and message structures may be stored or transmitted via a data transmission medium, such as a signal on a communications link. Various communications links may be used, such as the Internet, a local area network, a wide area network, or a point-to-point dial-up connection.

The desktop assistant system may be implemented on various computing systems or devices including personal computers, server computers, multiprocessor systems, microprocessor-based systems, network PCs, minicomputers, mainframe computers, distributed computing environments that include any of the above systems or devices, and the like. The desktop assistant system may be used by various computing systems such as personal computers, cell phones, personal digital assistants, consumer electronics, home automation devices, and so on.

The desktop assistant system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 6:
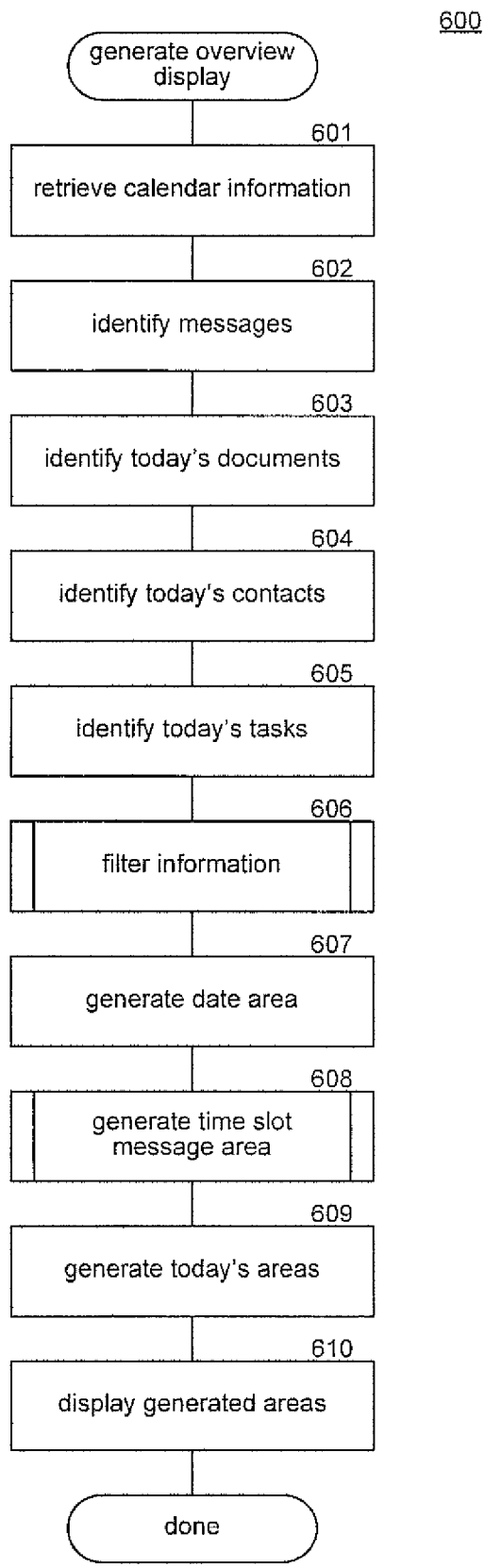
FIG. 6 is a flow diagram that illustrates the processing of the generate overview page component of the desktop assistant system in one embodiment.

FIG. 6 is a flow diagram that illustrates the processing of the generate overview page component of the desktop assistant system in one embodiment. The component 600 is invoked to generate the display page of FIG. 1. In block 601, the component retrieves calendar information for the user by interacting with a calendar client application. In block 602, the component identifies messages of the user by interacting with various message client applications. In block 603, the component identifies documents that the user may need today. In block 604, the component identifies contacts with whom the user may need to communicate today. In block 605, the component identifies tasks that the user has scheduled to perform today. In block 606, the component invokes the filter information component to filter out the information items that do not satisfy the priority threshold. In block 607, the component generates a date area. In block 608, the component invokes the generate time slot message area component to generate messages aligned by time slot and message type. In block 609, the component generates today's documents, primary contacts, and tasks areas. In block 610, the component displays the generated areas as a display page and then completes.

Figure 7:
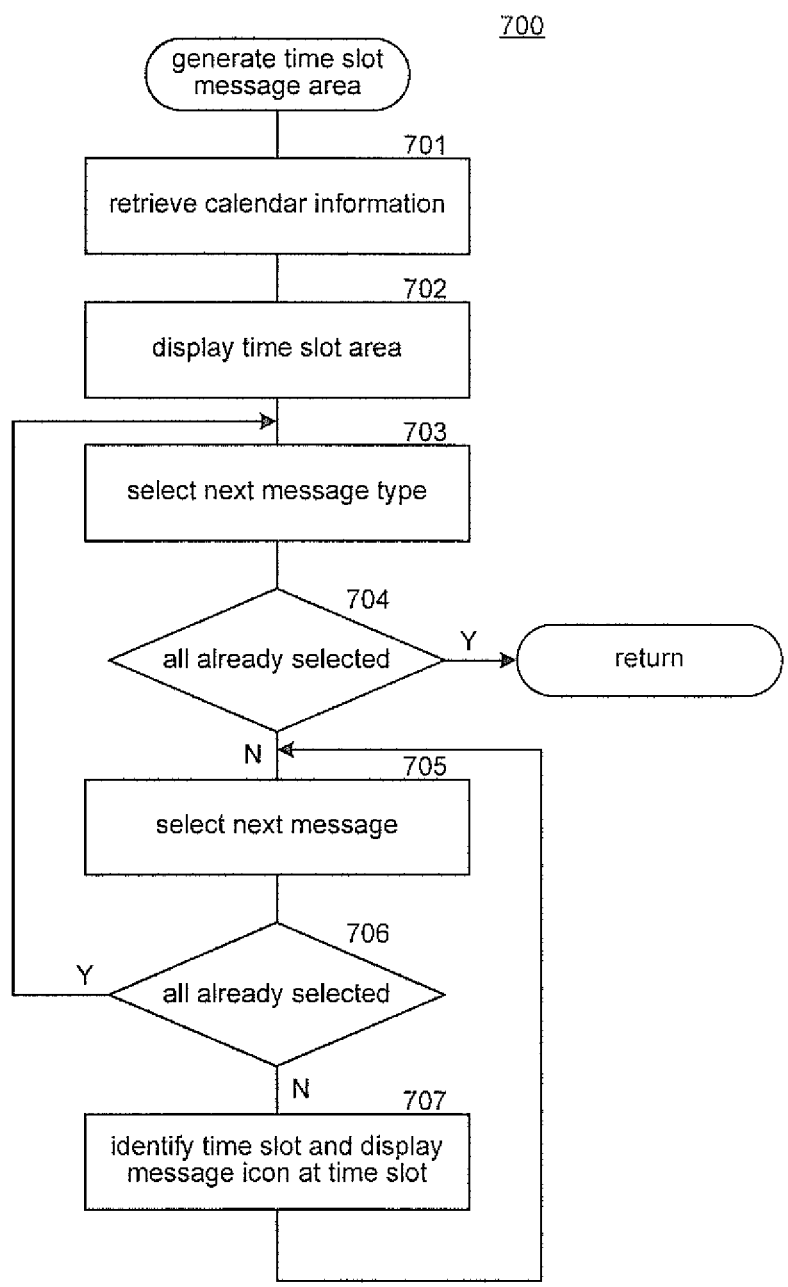
FIG. 7 is a flow diagram that illustrates the processing of the generate time slot message area component of the desktop assistant system in one embodiment.

FIG. 7 is a flow diagram that illustrates the processing of the generate time slot message area component of the desktop assistant system in one embodiment. The component 700 generates an area that includes indications of messages aligned by time slot and aligned by message type. In block 701, the component retrieves calendar information for the user. In block 702, the component generates a time slot area that includes a timeline marked with the times of the time slot and optionally calendar information. In blocks 703-707, the component loops selecting each message type and each message within each message type and displaying an indication of the messages aligned by time slot and message type. In block 703, the component selects the next message type. In decision block 704, if all the message types have already been selected, then the component returns, else the component continues at block 705. In block 705, the component selects the next message of the selected message type. In decision block 706, if all the messages of the selected message type have already been selected, then the component loops to block 703 to select the next message type, else the component continues at block 707. In block 707, the component displays a message icon for the selected message aligned with the appropriate time slot and message type. The component then loops to block 705 to select the next message.

Figure 8:
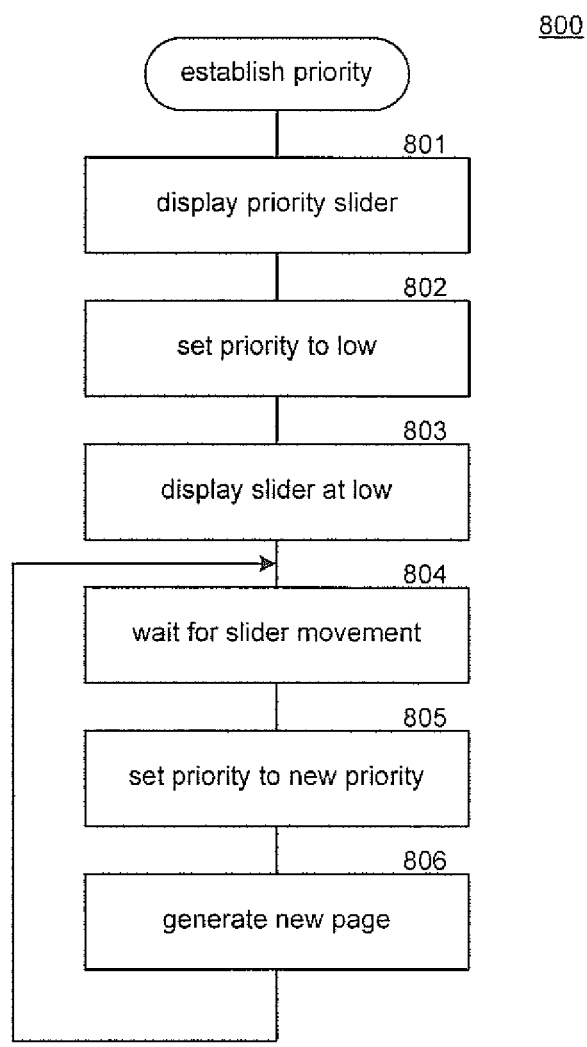
FIG. 8 is a flow diagram that illustrates the processing of the establish priority component of the desktop assistant system in one embodiment.

FIG. 8 is a flow diagram that illustrates the processing of the establish priority component of the desktop assistant system in one embodiment. The component 800 controls the priority selector and generates a new page to reflect a change in the priority threshold. In block 801, the component displays a priority slider. In block 802, the component initially sets the priority threshold to low. In block 803, the component displays the slider to indicate low priority. In blocks 804-806, the component loops waiting for slider movement and generating new pages based on the adjusted priority threshold. In block 804, the component waits for slider movement. In block 805, the component sets the priority threshold to the new priority threshold. In block 806, the component generates a new page (e.g., overview page or detailed page) based on the new priority threshold and loops to block 804 to wait for the next slider movement.

Figure 9:
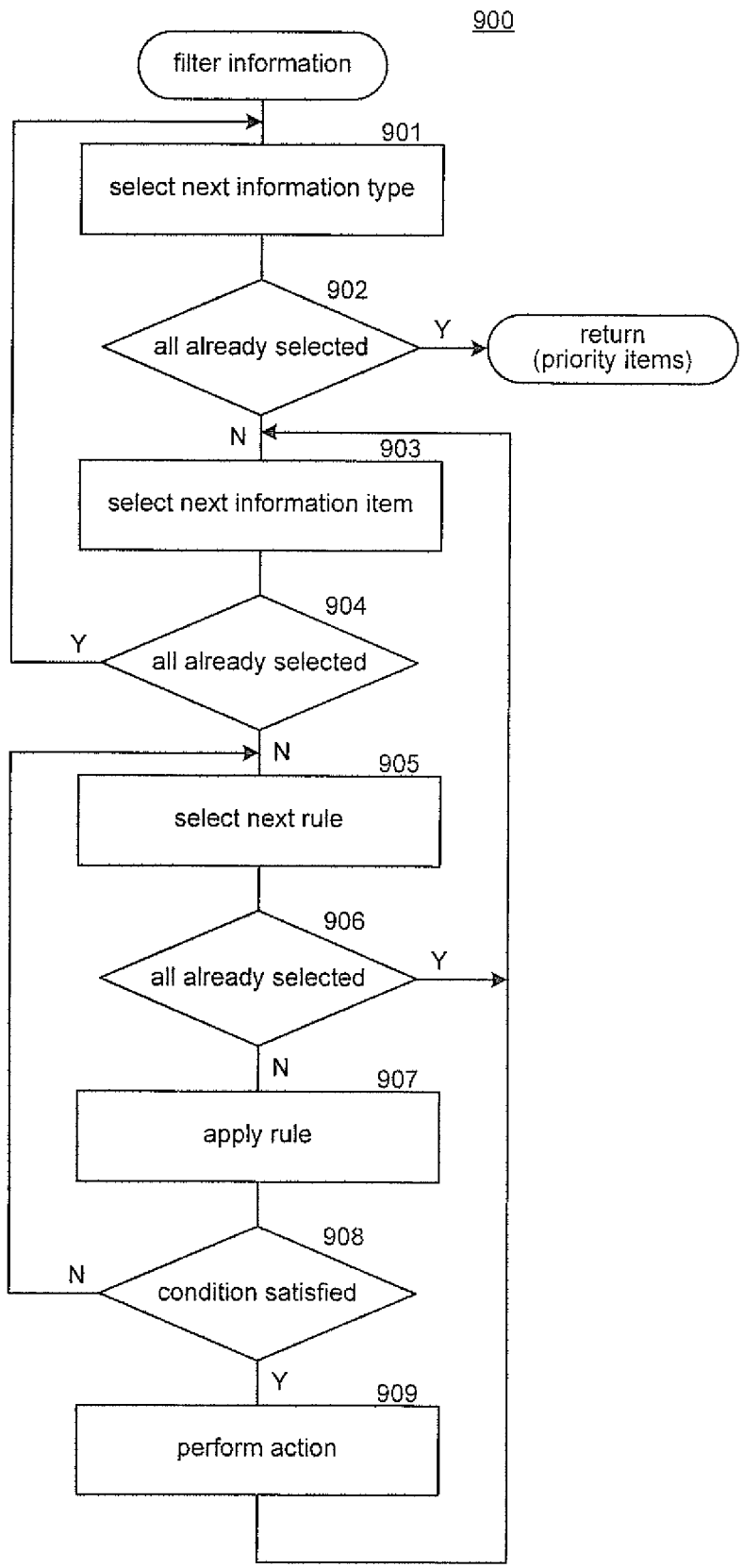
FIG. 9 is a flow diagram that illustrates the processing of the filter information component of the desktop assistant system in one embodiment.

FIG. 9 is a flow diagram that illustrates the processing of the filter information component of the desktop assistant system in one embodiment. The component 900 is passed information items and filters out information items that do not satisfy the priority threshold, which may be set by the user or automatically by the desktop assistant system. In block 901, the component selects the next information type (e.g., message or calendar item). In decision block 902, if all the information types have already been selected, then the component returns the information items that have been marked as satisfying the priority threshold, else the component continues at block 903. In block 903, the component selects the next information item for the selected information type. In decision block 904, if all such information items have already been selected, then the component loops to block 901 to select the next information type, else the component continues at block 905. In block 905, the component selects the next rule for determining whether an information item satisfies the priority threshold. In decision block 906, if all the rules have already been selected, then the selected information item does not satisfy the priority threshold and the component loops to block 903 to select the next information item, else the component continues at block 907. In block 907, the component applies the selected rule to the selected information item. In decision block 908, if the condition of the rule is satisfied, then the component continues at block 909, else the component loops to block 905 to select the next rule. In block 909, the component performs the action of the rule such as marking the selected information item as satisfying or not satisfying the priority threshold. The component then loops to block 903 to select the next information item.

Figure 10:
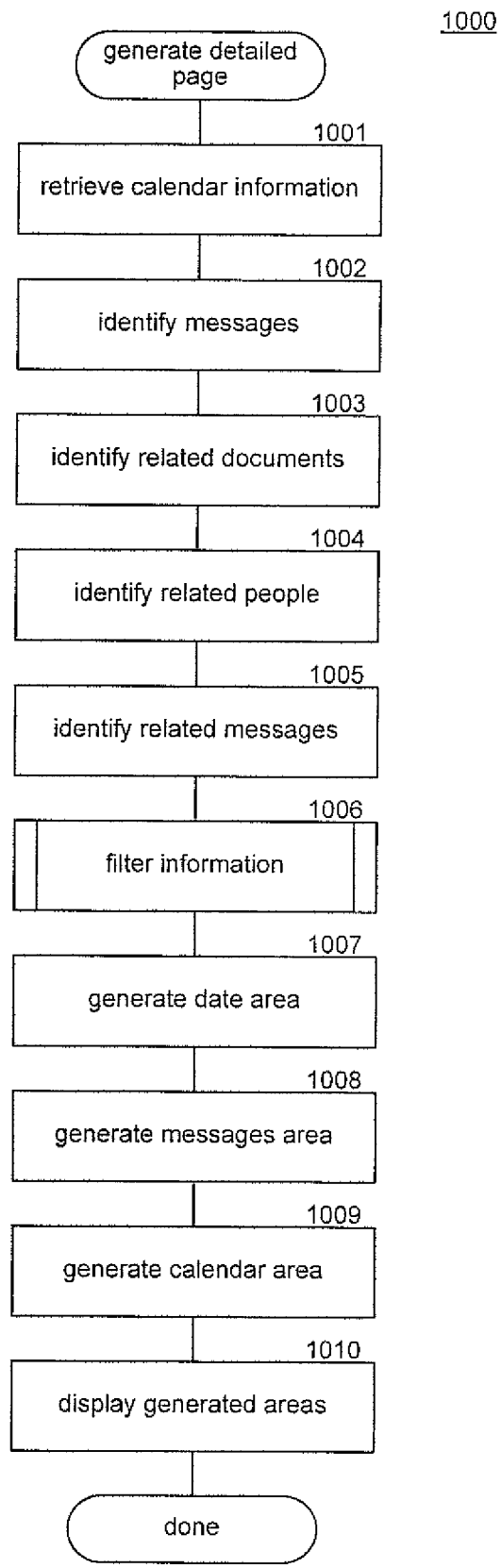
FIG. 10 is a flow diagram that illustrates the processing of the generate detailed page component of the desktop assistant system in one embodiment.

FIG. 10 is a flow diagram that illustrates the processing of the generate detailed page component of the desktop assistant system in one embodiment. The component 1000 generates the detailed page of FIG. 4 for a selected information item. In block 1001, the component retrieves calendar information for the user. In block 1002, the component identifies messages of the user. In block 1003, the component identifies documents related to the selected information item. In block 1004, the component identifies people related to the selected information item. In block 1005, the component identifies messages related to the selected information item. In block 1006, the component invokes the filter information component to filter out information items that do not satisfy the priority threshold. In block 1007, the component generates a date area. In block 1008, the component generates a messages area. In block 1009, the component generates a calendar area. In block 1010, the component displays the generated areas as illustrated in FIG. 4. The component then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer system for providing an aggregation of information, the system comprising:
   a processing unit configured to
      collect a plurality of messages of a user, the plurality of messages including a first message of a first message type accessible through a first client application and a second message of a second message type accessible through a second client application, the first client application being different than the second client application;

determine a first indicator for the first message based on the first message type;

display the first indicator for the first message within a timeline displayed within a graphical user interface, the first indicator aligned with a time slot included in the timeline associated with a time of the first message within a first area of the graphical user interface associated with the first message type;

determine a second indicator for the second message based on the second message type, the second indicator being different than the first indicator;

display the second indicator for the second message within the timeline, the second indicator aligned with a time slot included in the timeline associated with a time of the second message within a second area of the graphical user interface associated with the second message type; and in response to selection of the first indicator, display an indicator of a separate collected information item related to the first message, wherein the separate collected information item includes at least one selected from a group consisting of a document, a third message, a meeting, and a contact, wherein the indicator of the separate collected information item is displayed within an area of the graphical user interface separate from the timeline and the area of the graphical user interface is associated with an item type of the separate collected information item, the item type being one selected from a group consisting of a message, a document, a meeting, and a contact.

2. The computer system of claim 1, wherein the first indicator is selectable by the user to view the first message and the second indicator is selectable by the user to view the second message.

3. The computer system of claim 1, wherein the timeline includes a plurality of timeslots arranged vertically within the timeline and the first indicator is displayed horizontally with respect to the timeslot associated with the time of the first message.

4. The computer system of claim 1, wherein the processing unit is further configured to display a third indicator representing a third message of the first message type, wherein the third indicator is the same as the first indicator.

5. The computer system of claim 4, wherein the third indicator is aligned with the first indicator within the timeline.

6. The computer system of claim 1, wherein the processing unit is configured to display the first indicator and the second indicator within the timeline in response to a selection of a meeting by the user, wherein the first message and the second message are automatically identified as being related to the meeting.

7. The computer system of claim 1, wherein the first message type includes an electronic mail message and wherein the second message type includes an instant message.

8. The computer system of claim 1, wherein the processing unit is further configured to display a description associated with the first indicator, wherein the description includes at least a portion of a subject line of the first message.

9. A non-transitory computer-readable medium storing computer-executable instructions for controlling a computing system to display indicators of information items, the computer-executable instructions comprising instructions that:

collect a plurality of messages of a user, the plurality of messages including a first message of a first message type accessible through a first client application and a second message of a second message type accessible through a second client application, the first client application being different than the second client application;

determine a first indicator for the first message based on the first message type;

display the first indicator for the first message within a timeline displayed within a graphical user interface, the first indicator aligned with a time slot included in the timeline associated with a time of the first message and the first indicator selectable by the user to view the first message, the first indicator aligned with the timeslot associated with the time of the first message within a first area of the graphical user interface associated with the first message type;

determine a second indicator for the second message based on the second message type, the second indicator being different than the first indicator;

display the second indicator for the second message within the timeline, the second indicator aligned with a time slot included in the timeline associated with a time of the second message and the second indicator selectable by the user to view the second message, the second indicator aligned with the timeslot associated with the time of the second message within a second area of the graphical user interface separate from the first area and associated with the second message type; and in response to selection of the first indicator, display an indicator of a separate collected information item related to the first message, wherein the indicator of the separate collected information item is displayed within one of a plurality of areas of the graphical user interface separate from the timeline and wherein each area of the plurality of areas of the graphical user interface is associated with an item type, and wherein the indicator of the separate collected item is displayed within the one of the plurality of areas associated with an item type of the separate collected item.

10. The computer-readable medium of claim 9, further comprising instructions that display a third indicator representing a third message of the first message type, wherein the third indicator is the same as the first indicator.

11. The computer-readable medium of claim 10, wherein the third indicator is aligned with the first indicator within the timeline.

12. The computer-readable medium of claim 9, wherein the instructions for displaying the first indicator and the second indicator within the timeline include instructions that display the first indicator and the second indicator in response to a selection of a meeting by the user, wherein the first message and the second message are automatically identified as being related to the meeting.

13. The computer-readable medium of claim 9, further comprising instructions that display a description associated with the first indicator, wherein the description includes at least a portion of a subject line of the first message.

14. A method of displaying indicators of information items, the method comprising:

collecting, with a processing unit, a plurality of messages of a user, the plurality of messages including a first message of a first message type accessible through a first client application and a second message of a second message type accessible through a second client application, the first client application being different than the second client application;

determining, with the processing unit, a first indicator for the first message based on the first message type;

displaying the first indicator for the first message within a timeline displayed within of a graphical user interface, the first indicator aligned with a time slot included in the timeline associated with a time of the first message;

determining, with the processing unit, a second indicator for the second message based on the second message type, the second indicator being different than the first indicator;

displaying the second indicator for the second message within the timeline of the graphical user interface, the second indicator aligned with a time slot included in the timeline associated with a time of the second message; and in response to selection of the first indicator, displaying an indicator of a separate collected information item related to the first message, wherein the separate collected information item includes at least one selected from a group consisting of a document, a meeting, and a contact, wherein the indicator of the separate collected information item is displayed within an area of the graphical user interface separate from the timeline and the area of the graphical user interface is associated with an item type of the separate collected information item.

15. The method of claim 14, further comprising, in response to selection of the first indicator, displaying collected related information for the first message.

* * * * *